(12) United States Patent
Agarwal et al.

(10) Patent No.: US 10,332,030 B2
(45) Date of Patent: Jun. 25, 2019

(54) MULTI-SENSOR DATA SUMMARIZATION

(71) Applicant: Tata Consultancy Services Limited, Mumbai (IN)

(72) Inventors: Puneet Agarwal, Noida (IN); Gautam Shroff, Gurgaon (IN); Sarmimala Saikia, Noida (IN); Ashwin Srinivasan, Sancoale (IN)

(73) Assignee: Tata Consultancy Services Limited, Mumbai (IN)

(*) Notice: Subject to any disclaimer, the term of this patent is extended or adjusted under 35 U.S.C. 154(b) by 569 days.

(21) Appl. No.: 15/058,837

(22) Filed: Mar. 2, 2016

(65) Prior Publication Data

US 2017/0109653 A1   Apr. 20, 2017

(30) Foreign Application Priority Data

Oct. 17, 2015   (IN) .................... 3945/MUM/2015

(51) Int. Cl.
*G06N 7/02* (2006.01)
*G06N 7/04* (2006.01)
(Continued)

(52) U.S. Cl.
CPC ......... *G06N 20/00* (2019.01); *G06F 16/2228* (2019.01); *G06F 16/285* (2019.01); *G06N 5/025* (2013.01); *H04Q 9/00* (2013.01)

(58) Field of Classification Search
CPC .................. G06N 99/005; G06N 5/025; G06F 17/30598; G06F 17/30321; H04Q 9/00
See application file for complete search history.

(56) References Cited

U.S. PATENT DOCUMENTS 7,715,961 B1   5/2010 Kargupta
7,937,167 B1 * 5/2011 Mesarina ............. H04W 8/186
                                                        340/870.11
(Continued)

FOREIGN PATENT DOCUMENTS

JP   2008-134750   6/2008
JP   2014-515844   7/2014
(Continued)

OTHER PUBLICATIONS

BIRCH—An efficient data clustering method for very large databases Zhang et al. (Year: 1999).*
(Continued)

*Primary Examiner* — Scott A. Waldron
*Assistant Examiner* — Ababacar Seck
(74) *Attorney, Agent, or Firm* — Finnegan, Henderson, Farabow, Garrett & Dunner LLP

(57) ABSTRACT

This disclosure relates generally to multi-sensor data, and more particularly to summarizing multi-sensor data. In one embodiment, the method includes computing plurality of histograms from sensor data associated with a plurality of sensors. The respective histograms of each sensor are clustered into a first plurality of sensor-clusters, and a first set of rules is extracted therefrom. First set of rules defines patterns of histograms of a set of sensors occurring frequently over a time-period. Two or more sensor-clusters from amongst the first plurality of sensor-clusters are merged selectively to obtain a second plurality of sensor-clusters. Second set of rules are extracted from the second plurality of sensor-clusters, and a set of correlated sensors are identified therefrom based on the second set of rules. Third set of rules are extracted from the set of correlated sensors, the third set of rules summarizes the multi-sensor data to represent prominent co-occurring sensor behaviors.

17 Claims, 5 Drawing Sheets

(51) Int. Cl.
  *G06N 7/06* (2006.01)
  *G06N 7/08* (2006.01)
  *G06N 20/00* (2019.01)
  *G06F 16/28* (2019.01)
  *G06F 16/22* (2019.01)
  *H04Q 9/00* (2006.01)
  *G06N 5/02* (2006.01)

(56) References Cited

U.S. PATENT DOCUMENTS

| | | |
|---|---|---|
| 2003/0023612 A1 | 1/2003 | Carlbom et al. |
| 2012/0224711 A1 | 9/2012 | Kim et al. |
| 2014/0039834 A1 | 2/2014 | Shibuya et al. |

FOREIGN PATENT DOCUMENTS

| | | |
|---|---|---|
| JP | 2014-174943 | 9/2014 |
| JP | 2015-108990 | 6/2015 |
| JP | 2015-132939 | 7/2015 |
| WO | WO-2015/145626 | 10/2015 |

OTHER PUBLICATIONS

BIRCH: A New Data Clustering Algorithm and Its Applications Zhang et al. (Year: 1997).*

Projective Clustering by Histograms Ng et al. (Year: 2005).*

CLUSMASTER: A Clustering Approach for Sampling Data Streams in Sensor Networks Da Silva et al. (Year: 2010).*

Fukui, K. et al. (Mar. 2015). "Mining Co-occurrences from Event Sequence Data—Extracting Damage Pattern in Fuel Cell and Occurrence Patternin Earthquakes," *Journal of the Japanese Society for Artificial Intelligence*, vol. 30, No. 2; pp. 238-246.

Sakurai, S. (Mar. 2012). "Application of Sequential Pattern Mining to Various Data Sets," *Journal of the Japanese Society for Artificial Intelligence*, vol. 27, No. 2; pp. 128-135.

Suzuki, H. (Jan. 2005). "Data Squashing—Scaling Down Strategy by Reversal Thinking, Information Processing," *Japan, Information Processing Society of Japan*, vol. 46, No. 1; pp. 12-19.

Notice of Allowance dated Sep. 5, 2017, in counterpart Japanese Application No. 2016-047735; 3 pages.

* cited by examiner

US 10,332,030 B2

MULTI-SENSOR DATA SUMMARIZATION

PRIORITY CLAIM

This U.S. patent application claims priority under 35 U.S.C. § 119 to: India Application No. 3945/MUM/2015, filed on Oct. 17, 2015. The entire contents of the aforementioned application are incorporated herein by reference.

TECHNICAL FIELD

This disclosure relates generally to summarizing multi-sensor data, and more particularly to clustering based summarizing of multi-sensor data.

BACKGROUND

Modern industrial equipment are equipped with a large number of sensors that continuously monitor the behavior of component parts and sub-systems thereof. For example, industrial machines, including consumer and commercial vehicles, aircrafts, power plants and manufacturing plants generally instrumented with a large number of sensors that continuously transmit their readings wirelessly. Due to increasingly ubiquitous Internet connectivity, often via cellular as well as metropolitan Wifi networks, modern equipment of all kinds regularly transmit sensor readings to their manufacturers (e.g. automobile, engine, or component OEMs) as well as operators (e.g. airline, factories, power plants). The data transmitted by industrial equipment can be utilized to determine different usage patterns and behavior of similar machines.

The inventors here have recognized several technical problems with such conventional systems, as explained below. The sensor data from machines is high-dimensional in nature, and clustering such data to find patterns regarding machine is often complex. Additionally, currently the usage patterns of machines are visualized over a day, or, alternatively a continuous run, via a distribution of values taken by each of possibly dozens or even hundreds of sensors, usually visualized as histograms. The number of such histograms can often be in hundreds of thousands, therefore in order to succinctly summarize such days of operation into dominant patterns is complex.

SUMMARY

Embodiments of the present disclosure present technological improvements as solutions to one or more of the above-mentioned technical problems recognized by the inventors in conventional systems. For example, in one embodiment, a computer-implemented method for summarization of multi-sensor data is provided. The method includes computing, via one or more hardware processors, a plurality of histograms from sensor data associated with a plurality of sensors. Further, the method includes, clustering via the one or more hardware processors and from the plurality of histograms, respective histograms of each of the plurality of sensors to obtain a first plurality of sensor-clusters based on shape of the respective histograms. Each sensor-cluster of the first plurality of sensor-clusters includes a centroid histogram representative of distinct sensor behavior for a distinct sensor of the plurality of sensors. Furthermore, the method includes performing, via the one or more hardware processors, frequent pattern mining on the first plurality of sensor-clusters to extract a first set of rules. A rule of the first set of rules is associated with a set of sensors of the plurality of sensors and includes a set of sensor-clusters occurring frequently in the first plurality of sensor-clusters over a time period.

Moreover, the method includes selectively merging, via the one or more hardware processors, two or more sensor-clusters from amongst the first plurality of sensor-clusters to obtain a second plurality of sensor-clusters. The two or more sensor-clusters are selected corresponding to a sensor of the set of sensors. The two or more sensor-clusters are merged based on two or more rules from amongst the first set of rules associated with the two or more sensor-clusters and a distance measure between the two or more sensor-clusters of the sensor. Additionally, the method includes extracting, via the one or more hardware processors, a second set of rules from the second plurality of sensor-clusters. The second set of rules are indicative of distinct sensor behaviors associated with the second plurality of sensor-clusters. Also, the method includes identifying a plurality of sets of correlated sensors from the second plurality of sensor-clusters based on the second set of rules. The method further includes extracting, via the one or more hardware processors, a third set of rules from the one or more sets of correlated sensors, the third set of rules summarizing the multi-sensor data to represent prominent co-occurring sensor behaviors.

In another embodiment, a computer implemented system for summarizing multi-sensor data is provided. The system includes a memory storing instructions and one or more hardware processors coupled to said memory. Said one or more hardware processors are configured by said instructions to compute a plurality of histograms from sensor data associated with a plurality of sensors. Further, the one or more hardware processors are configured by said instructions to cluster, from the plurality of histograms, respective histograms of each of the plurality of sensors to obtain a first plurality of sensor-clusters based on shape of the respective histograms. Each sensor-cluster of the first plurality of sensor-clusters includes a centroid histogram representative of distinct sensor behavior for a distinct sensor of the plurality of sensors. Furthermore, the one or more hardware processors are configured by said instructions to perform frequent pattern mining on the first plurality of sensor-clusters to extract a first set of rules. A rule of the first set of rules is associated with a set of sensors of the plurality of sensors and includes a set of sensor-clusters occurring frequently in the first plurality of sensor-clusters over a time period.

Moreover, the one or more hardware processors are configured by said instructions to selectively merge two or more sensor-clusters from amongst the first plurality of sensor-clusters to obtain a second plurality of sensor-clusters. The two or more sensor-clusters are selected corresponding to a sensor of the set of sensors. The two or more sensor-clusters are merged based on two or more rules from amongst the first set of rules associated with the two or more sensor-clusters and a distance measure between the two or more sensor-clusters of the sensor. Additionally, the one or more hardware processors are configured by said instructions to extract a second set of rules from the second plurality of sensor-clusters. The second set of rules are indicative of distinct sensor behaviors associated with the second plurality of sensor-clusters. Also, the one or more hardware processors are configured by said instructions to identify a plurality of sets of correlated sensors from the second plurality of sensor-clusters based on the second set of rules. The one or more hardware processors further are configured by said instructions to, extract a third set of rules from the one or more sets of correlated sensors, where the third set of rules summarizes the multi-sensor data to represent prominent co-occurring sensor behaviors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
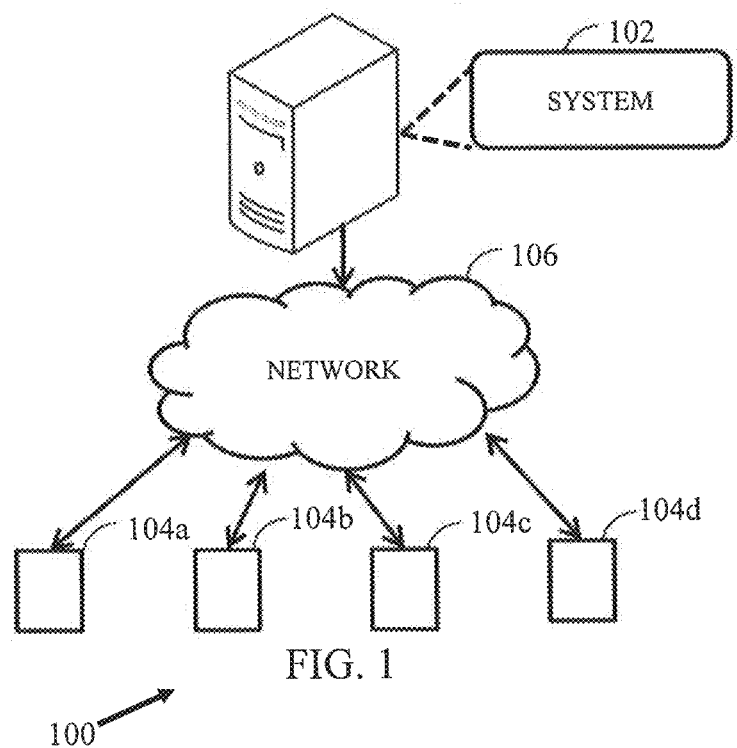
FIG. 1 illustrates a network implementation of a system for summarizing multi-sensor data, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for summarizing multi-sensor data are disclosed in present subject. The multi-sensor data may be received from industrial machines, such as production equipment. The multi-sensor data may be analysed to determine actual usage patterns to which the products or industrial machines are subjected to in the field. Understanding of the actual equipment usage patterns is important for developing and improving operational maintenance plans (for example, in the case of operators), and can even prove valuable for high value insurers, e.g. of costly assets such as aircraft or nuclear plants. Various embodiments disclosed herein provide methods and systems for summarizing the multi-sensor data to determine different dominant usage patterns and a correlation between other features related to machinery use. For instance, the disclosed methods and the systems may facilitate in analysing whether a particular usage pattern of an engine corresponds the type of equipment it is installed in, or whether a certain driving behaviour is peculiar to certain models of vehicles, or geographies, and so on.

The patterns (for example, usage patterns of a machine) may be determined over a time period of operation such as a day, or, alternatively a 'continuous run', via the distribution of values taken by each of sensors. The embodiments disclosed herein facilitates in succinctly summarizing such time period of operation into dominant patterns, i.e., arrange most machine-days for which data is available into one or more groups, with different groups being characterized by distinct behaviour patterns in terms of distributions (for example, histograms) observed for the sensor data. The different behaviour patterns are may be characterized by different subsets of sensors.

Various embodiments disclosed herein provide methods and systems to summarize a large number of days of machine operation by a relatively small set of rules, where each rule comprises of memberships in clusters of possibly different sensors. In an embodiment, the system disclosed herein first clusters days according to each sensor separately and then combines the clusters using communities in a specially constructed graph that considers common days within clusters of different sensors as well as histogram similarity between clusters of the same sensor. In the process some clusters of a single sensor get merged. The system further identifies rules defined in terms of single-sensor cluster memberships, with each rule possibly using different sets of sensor-clusters. A small set of such rules that also cover a large fraction of days are determined by clustering rules based on mutual overlaps.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for summarizing multi-sensor data shall be implemented, has been explained in details with respect to the FIGS. 1 through 6C. While aspects of described methods and systems for summarizing multi-sensor data can be implemented in any number of different systems, utility environments, and/or configurations, the embodiments are described in the context of the following exemplary system(s).

Referring now to FIG. 1, a network implementation 100 of system 102 for summarizing multi-sensor data is illustrated, in accordance with an embodiment of the present subject matter. In one embodiment, the system 102 is caused to succinctly summarize the usage and behavioral patterns of a collection of machines using multi-sensor data observed over a large number of days (or 'runs'), in the form of a set of rules. Each rule is described by membership in clusters of possibly different sets of sensors. Each sensor-cluster identifies a particular distribution of sensor data/values over a time period (for example, across a day).

Although the present subject matter is explained considering that the system 102 is implemented for summarizing multi-sensor data, it may be understood that the system 102 may is not restricted to any particular machine or environment. The system 102 can be utilized for a variety of domains as well as for sensor-data where high-dimensional data (such as multi-sensor data) is involved. The system 102 is configured to perform multi-subspace clustering of the high-dimensional data by collaborative clustering on a subset of high-dimensional data using graph based techniques including, but not limited to, community detection, frequent pattern mining and histogram clustering. The system 102 may be implemented in a variety of computing systems, such as a laptop computer, a desktop computer, a notebook, a workstation, a mainframe computer, a server, a network server, and the like.

Herein, the system 102 may receive the sensor data from multiple devices one or more devices and/or machines 104-1, 104-2, . . . 104-N, collectively referred to as sensor devices 104 hereinafter. Examples of the sensor devices 104 may include, but are not limited to, industrial machines, a portable computer, a personal digital assistant, a handheld device, a workstation, sensor embodying devices, as storage devices equipped in the machines to store the sensor readings, and so on. The sensor devices 104 are communicatively coupled to the system 102 through a network 106. The terms 'sensor devices' and 'sensors' may refer to the devices that may provide sensor data to the system 102, and thus the terms 'sensor device' and 'sensor' may be used interchangeably throughout the description. In an embodiment, the sensor devices 104 may include heavy duty industrial machines which contain readings/data from various sensors (engine speed, fuel consumption, and the like) observed on regular intervals of time.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The sensor devices 104 may send sensor data to the system 102 via the network 106. The system 102 is caused to analyze the sensor data to summarize machine usage. Herein, the sensor data that is received from multiple sensors for the specified time-period may be referred to as 'multi-sensor data'. A sensor's behavior over a period of operation can be represented by a histogram that can capture the distribution of different values of that sensor data for a specified time-period over which the machine runs. The time period can be a single run of the machine, a day, a week, and so on.

In an embodiment, the system 102 is caused to compute multiple histogram (or intensity profiles) from the sensor data. The system 102 is caused to compute histograms representative of each of the sensors' behavior for each day. An example of a plurality of histograms corresponding to multiple sensors for multiple days is described further with reference to FIG. 3. The system 102 is caused to systematically summarize the multi-sensor data to determine machine behavior. An example implementation of the system 102 for summarizing the multi-sensor data is described further with reference to FIG. 2.

Figure 2:
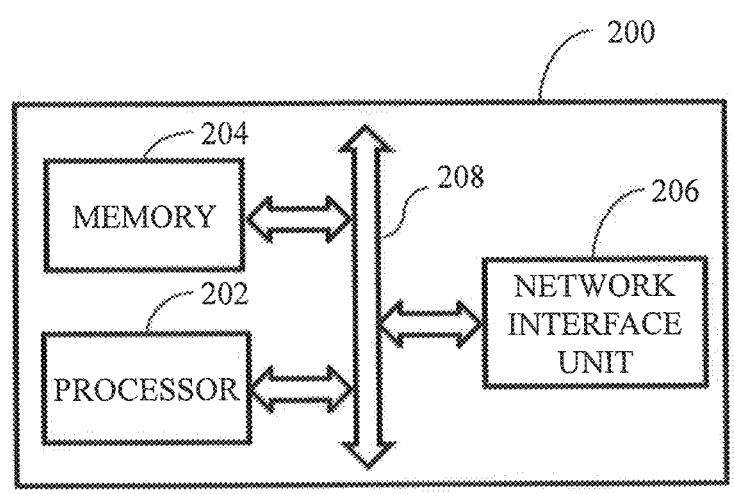
FIG. 2 is a functional block diagram of a system for summarizing multi-sensor data, according to some embodiments of the present disclosure.

FIG. 2 illustrates a block diagram of a system 200 for summarizing multi-sensor data, in accordance with an embodiment of the present disclosure. The system 200 includes or is otherwise in communication with one or more hardware processors such as a processor 202, at least one memory such as a memory 204, and a network interface unit such as a network interface unit 206. In an embodiment, the processor 202, memory 204, and the network interface unit 206 may be coupled by a system bus such as a system bus 208 or a similar mechanism.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store any number of pieces of information, and data, used by the system to implement the functions of the system. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments.

The network interface unit 206 is configured to facilitate communication between the sensors (or the devices incorporating the sensors) and the system 200. The network interface unit 206 may be in form of a wireless connection or a wired connection. Examples of wireless network interface element 206 may include, but are not limited to, IEEE 802.11 (Wifi), BLUETOOTH®, or a wide-area wireless connection. Example of wired network interface element 206 includes, but is not limited to Ethernet.

The system 200 is caused to receive, via the network interface unit 206, sensor data (T) associated with a plurality of sensors collected over a time period. For example, for a multi-sensor time-series data, $T_i$ represented as below,
$T_i = \{v^{(t)}: t^{(t)} \in \{1, 2, \ldots, m\}\}$,
where, $v^{(t)} \in R^N$ such that $v^{(t)} = \{v_1^{(t)}, v_2^{(t)} \ldots, v_N^{(t)}\}$
where, N is the number of the plurality of sensors and m is the total length of the time-series. The multi-sensor data may include various such time-series for a time period (such as multiple days of operations),
i.e., $T = \{T_1, T_2, \ldots, T_D\}$, where D is the number of days of operation.

In an embodiment, the processor 202 is configured to, with the content of the memory 204, and optionally with other components described herein, to cause the system 200 to partition the sensor data T into a plurality of portions such that each of the plurality of portions includes the sensor data for a day's operation of the machine. The processor 202 is configured to, with the content of the memory 204, and optionally with other components described herein, to cause the system 200 to compute a plurality of histograms from each of the portions for the plurality of sensors, thereby generating a set of histograms $\hat{H}_k$. For a sensor k and i-th machine-day of operation $d_i$, a histogram $H_{ki}$ is computed from its values $\{v_k^{(t)}: t \in \{1, 2, \ldots, m\}\}$ s.t. $H_{ki} = \{(b_{jk}, f_{jk}^{(i)}): j \in \{1, 2, \ldots, B\}\}$ Here, B is the number of intervals, an interval $b_{jk}$ is defined by limits $[l_{jk}, u_{jk})$, and $f_{jk}^{(i)}$ is the fraction of values that lie in the interval $b_{jk}$.

In an embodiment, the processor 202 is configured to, with the content of the memory 204, and optionally with other components described herein, to cause the system 200 to compute the histograms for all sensors for every day of operation. The system 200 may be caused to compute N histograms for N different sensors of a day $d_i$ as:
$H_k = \{H_{1i}, H_{2i}, \ldots, H_{ni}\}$.
Also, for D days of operation, the set of histograms may be represented as $\hat{H}_k$:
$\hat{H}_k = \{H_{k1}, H_{k2}, \ldots, H_{kD}\}$ for every sensor k.

In an embodiment, the processor 202 is configured to, with the content of the memory 204, and optionally with other components described herein, to cause the system 200 to compute a plurality of histograms ($H_k$) from the sensor data such that each histogram of the plurality of histograms is representative of sensor behavior over a time period (for example, each day of the plurality of days). The histograms are computed with a fixed set of bins B for every sensor. A day ($d_i$) can be represented by a set of histograms of all sensors for that day,
i.e. $d_i \equiv \{H_{1i}, H_{2i}, \ldots, H_{Ni}\}$.
Herein, each of the histograms is a B dimensional vector.

The processor 202 is configured to, with the content of the memory 204, and optionally with other components described herein, to cause the system 200 to group/cluster the histograms of each of the plurality of sensors into a first plurality of sensor-clusters, such that each sensor-cluster includes histograms of similar shape. Each sensor-cluster of the first plurality of sensor-clusters includes a cluster of histograms corresponding to a sensor for one or more days. In an embodiment, the system 200 is caused to cluster the set of similar histograms in a sensor-cluster such that a distance measure between the histograms of the set of similar histograms is less than a threshold distance measure. For example, a set of histograms (or similar histograms), $H_k$ may form a sensor-cluster, $C_{kn}$, so that $D(H_{ki}, H_{kj}) < \tau_{nk}$, for any pair $H_{ki}, H_{kj} \in C_{kn}$, where $D(H_{ki}, H_{kj})$ is the distance between the histograms $H_{ki}$ and $H_{kj}$. So, two histograms $H_{ki}$ and $H_{kj}$ of sensor k for different days of operation may be termed as similar if the distance measure $D(H_{ki}, H_{kj})$ between the histograms is less than a first threshold value of the distance measure ($\tau_{nk}$). Herein, the distance between the histograms is representative of shape similarity between the histograms. In an embodiment, the distance between the histograms may be an Euclidean distance, an Earth mover distance, Kullback-Leibler divergence, Bhattacharyya distance, Manhattan distance, Wasserstein metric (: also known as the Kantorovich metric), and so on.

In an embodiment, the processor 202 is configured to, with the content of the memory 204, and optionally with other components described herein, to cause the system 200 to utilize a clustering model such as spherical clustering model, Balanced Iterative Reducing and Clustering using Hierarchies (BIRCH), for clustering the histograms into sensor-clusters. The BIRCH clustering model takes an initial value of distance measure threshold $\tau_1$ as a parameter. In an embodiment, the system 200 is caused to utilize the value of radius ($\tau_1/2$) of spherical sensor-clusters as the first threshold value of the distance measure. The first threshold value of distance measure may depend on the quality and number of clusters associated with a sensor. In an embodiment, a DB-Index may be utilized as a statistical measure of quality of sensor-clusters. The processor 202 is configured to, with the content of the memory 204, and optionally with other components described herein, to cause the system 200 to perform the BIRCH clustering for various values of and select that value of $\tau_1/2$ for which the value of DB-index is optimum. The DB-index is a metric for evaluating clustering models, where the validation of how well the clustering has been done is made using quantities and features inherent to a dataset. In an embodiment, the value of $\tau_1$ may be selected to be as low as possible for optimum value of DB-index while also ensuring that the centroid of a sensor-cluster represents the histograms in that cluster. Clustering the sensors individually generates a set of sensor-clusters, $C_{kn}$ $\forall k \in N$. In an embodiment, the processor 202 is configured to, with the content of the memory 204, and optionally with other components described herein, to cause the system 200 to represent the days by the set of sensor-clusters of the different sensor in which the sensor histograms lie. Herein, a day may be represented as $\{C_{1i}, C_{2i}, \ldots, C_{Ni}\}$ where i $\in$ 1, 2, . . . , n.

In an embodiment, the processor 202 is configured to, with the content of the memory 204, and optionally with other components described herein, to cause the system 200 to extract a first set of rules from the first plurality of sensor-clusters such that a rule of the first set of rules is associated with a set of sensors of the plurality of sensors, and includes a set of sensor-clusters occurring frequently in the first plurality of sensor-clusters over a time period. Hereinafter, the patterns of histograms frequently occurring over a period of time may be referred to as 'frequently occurring patterns'. In an embodiment, for extracting the first set of rules, the processor 202 is configured to, with the content of the memory 204, and optionally with other components described herein, to cause the system 200 to identify the first plurality of sensor-clusters associated with different sensors that have many days in common. In an embodiment, the first plurality of sensor-clusters having many days in common may be determined by performing frequent pattern mining on the first plurality of sensor-clusters. The frequent pattern mining may be performed by frequent pattern mining model, for example, a FP-Growth model.

In an embodiment, the processor 202 is configured to, with the content of the memory 204, and optionally with other components described herein, to cause the system 200 to refine the first plurality of sensor-clusters by broadening the threshold value of the distance measure ($\tau_{nk}$) associated with the sensor-clusters. In an embodiment, the processor 202 is configured to, with the content of the memory 204, and optionally with other components described herein, to cause the system 200 to include more days in a sensor-cluster collaboratively based on behavior of other sensors for the same time period. In an embodiment, the processor 202 is configured to, with the content of the memory 204, and optionally with other components described herein, to cause the system 200 to selectively merge two or more sensor-clusters of a sensor from the first plurality of sensor-clusters so as to include more days in a sensor-cluster collaboratively based on behavior of other sensors for the same days. In an embodiment, while selectively merging the two or more sensor-clusters, the system 200 may be caused to merge similar sensor-clusters of a sensor when said sensor-clusters have most of the days common with sensor-cluster(s) of other sensor(s) of the plurality of sensors. The sensor-clusters of different sensors having mostly same set of days may be hereinafter referred to as 'co-occurring sensor-clusters', and the sensors occurring in those 'co-occurring sensor-clusters' may be referred to as 'co-occurring sensors'.

In an embodiment, the two or more sensor-clusters of a sensor are merged based on a determination of co-occurrence of sensors in the two or more sensor-clusters for same set of days, so as to identify candidate sensor-clusters for merging that have most of the days common with a sensor-cluster of another sensor, while a distance measure (for example, Euclidean distance) between the centroids of the sensor-clusters still remains bounded by a second threshold $\tau_2$. In an embodiment, the processor 202 is configured to, with the content of the memory 204, and optionally with other components described herein, to cause the system 200 to determine the co-occurrence of sensors in the two or more sensor-clusters based on two or ore rules from amongst the first set of rules associated with the two or more sensor-clusters and a distance measure between the two or more sensor-clusters. In an embodiment, the system 200 may be caused to employ a graph based technique for identifying candidate sensor-clusters for merging. The graph based technique may include representing the plurality of sensor-clusters and the first set of rules in form of a first graph having a plurality of nodes and a plurality of edges connecting the plurality of nodes. The plurality of nodes represents the plurality of sensor-clusters associated with a set of sensors present in the set of frequent patterns. An edge between two nodes of the graph is made if the two sensor-clusters belong to the same sensor and the distance between the said sensor-clusters is smaller than the second threshold $\tau_2$. The s processor 202 is configured to, with the content of the memory 204, and optionally with other components described herein, to cause the system 200 to encode the distance as the weight of such an edge. An edge between two nodes of the graph is also made if the two sensor-clusters are present in a frequent-pattern/rule. The system 200 is also caused to encode the support of the frequent-pattern as the weight of such an edge. So, the plurality of edges includes a set of intra-cluster edge and a set of inter-cluster edge. Herein, an inter-cluster edge includes an edge between sensor-clusters associated with a rule from amongst the first set of rules, and an intra-cluster edge includes an edge between sensor-clusters of a sensor having the distance between the sensor-clusters less than the second threshold distance measure. An example of a graph having inter-cluster edge and intra-duster edges is described further with reference to FIG. 4. Herein, the weights associated with the intra-edge and the inter-edge are on different scales, so the system 200 is caused to normalize the weights of the intra-edge and the inter-edge.

The processor 202 is configured to, with the content of the memory 204, and optionally with other components described herein, to cause the system 200 to identify a plurality of sub-graphs in the first graph such that each sub-graph has strongly related sensor-clusters. The first graph is configured in a manner that the nodes of a sub-graph in the first graph are densely connected with each other and sparsely connected with other nodes. In an embodiment, the sub-graphs in the first graph are identified based on the modularity using standard techniques, such as graph modularity or community detection. If two or more sensor-clusters of a sensor are present in one sub-graph, then the two or more sensor-clusters are applicable for cluster merging. In other words, if two or more sensor-clusters of the same sensor occur in the same sub-graph, the two or more sensor-clusters are merged together resulting in a second plurality of sensor-clusters (or merged sensor-clusters). The processor 202 is configured to, with the content of the memory 204, and optionally with other components described herein, to cause the system 200 to compute a revised distance measure thresholds $\tau_{nk}$ for such merged sensor-clusters. In an embodiment, the sensor-clusters that are not merged retain their initial thresholds distance measure (i.e. the first threshold distance measure).

Upon merging the sensor-clusters of the same sensors, the system 200 is caused to update sensor-clusters for all the sensors, and re-encode the days using the second plurality of sensor-clusters or centroids thereof. Since the second plurality of sensor-clusters have been created collaboratively based on co-occurrence with sensor-clusters of other sensors, the second plurality of sensor-clusters are more likely to facilitate in identifying frequently occurring sensor behaviors with high support.

In an embodiment, the processor 202 is configured to, with the content of the memory 204, and optionally with other components described herein, to cause the system 200 to extract a second set of rules from the second plurality of sensor-clusters such that the second set of rules is indicative of distinct sensor behaviors associated with the second plurality of sensor-clusters. The second set of rules may be determined by performing frequent pattern mining on the second plurality of sensor-clusters.

The processor 202 is configured to, with the content of the memory 204, and optionally with other components described herein, to cause the system 200 to identify a plurality of sets of correlated sensors from the second plurality of sensor-clusters based on the second set of rules. In an embodiment, for identifying the plurality of sets of correlated sensors, the second set of rules are represented in form of a second graph. The second graph includes a plurality of nodes and a plurality of edges connecting the plurality of nodes, such that the plurality of nodes represents the second plurality of sensor-clusters, and the plurality of edges includes a set of inter-cluster edges. The second graph may be utilized to identify the plurality of sets of correlated sensors based on the technique of graph modularity or community detection, where the second graph may be partitioned into a plurality of sub-graphs such that a sub-graph of the second graph may represent a set of correlated sensors. It will be understood that in the second graph, there is only one type of edge, namely, inter-cluster edge. Based on community detection, the system 200 is caused to identify the plurality of sets of correlated sensors from the sensor-clusters present in the plurality of sub-graphs (or communities). In an embodiment, the processor 202 is configured to, with the content of the memory 204, and optionally with other components described herein, to cause the system 200 to identify a plurality of unique/distinct sensors associated with the second plurality of sensor-clusters of the sub-graphs from the second graph, such that the plurality of unique sensors represents the set of correlated sensors. For example, a community or a sub-graph $\{C_{11}, C_{12}, C_{24}, C_{35}\}$ may generate a set of correlated sensors $\{s_1, s_2, s_3\}$. The set of correlated sensors $S_{cor}$ may be determined as:

$S_{cor} = \{Cr_1, Cr_2, \ldots, Cr_p\}$ where
$Cr_p = <s_i, s_j, s_k \ldots>$ is pth set of correlated sensors.

The processor 202 is configured to, with the content of the memory 204, and optionally with other components described herein, to cause the system 200 to extract a third set of rules from the plurality of sets of correlated sensors where the third set of rules summarizes the multi-sensor data to represent prominent co-occurring sensor behaviors. In an embodiment, the system 200 is caused to extract the third set of rules from the sets of correlated sensors by performing frequent pattern mining for each set of correlated sensors. Herein, as the number of sensors to be considered-for each step of the frequent pattern mining is reduced, the number of unique items in each step is also reduced, so the system 200 is caused to identify the third set of rules (or patterns) with low support. In an embodiment, the frequent pattern mining on p sets of correlated sensors may result in identification of a set of correlated sensors.

$F_{com} = \{F_{Cr1}, F_{Cr2}, \ldots, F_{Crp}\}$
where, $Cr_p$ is a set of correlated sensors, and
$F_{Crp}$ is the set of frequent items (or patterns) generated from the set of correlated sensors $Cr_p$.

The processor 202 is configured to, with the content of the memory 204, and optionally with other components described herein, to cause the system 200 to cluster (or combine) the set of frequent patterns generated from the plurality of sets of correlated sensors to generate the third set of rules. The third set of rules represents a set of candidate frequent patterns. In an embodiment, the system 200 is caused to generate the third set of rules from the set of candidate frequent patterns based on a rule-clustering technique. In the rule-based clustering technique, the system 200 is caused to define a distance measure between each pair of rules in the third set of rules. The distance measure is inversely proportional to the mutual overlap in the data that the rule covers (i.e., the transactions they cover). The set of frequent patterns are clustered via a density-based technique, such as DBSCAN under this distance measure. As a result, rules in the same cluster are highly overlapping, so including more than one rule from each cluster is unlikely to increase the coverage of the overall set of rules. The system 200 is caused to select the most frequent rule from each rule-cluster, which together form the final set of rules that summarize the data succinctly while ensuring a high coverage.

Figure 3:
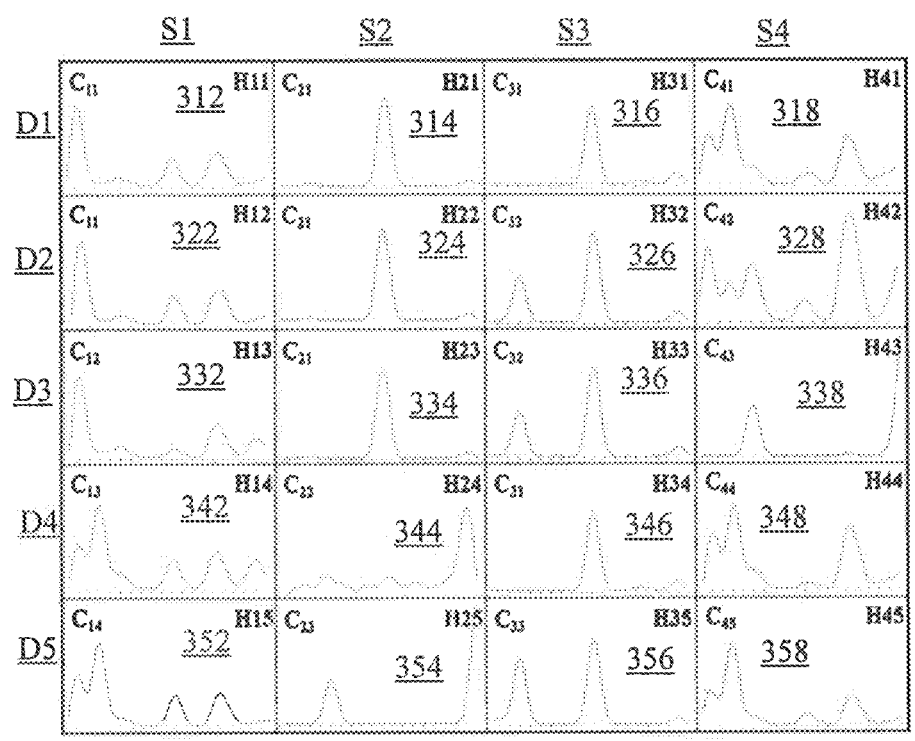
FIG. 3 illustrates an example of histograms for a plurality of sensors over a plurality of days for summarizing multi-sensor data, in accordance with some embodiments of the present disclosure.

FIG. 3 illustrates an example of histograms for a plurality of sensors over a plurality of days, in accordance with an example embodiment. The plurality of sensors may record sensor data over a time period, and such sensor data may be utilized for generating a plurality of histograms. For example, the sensor data may be derived from heavy duty industrial machines which contain readings from various sensors (engine speed, fuel consumption, and so on) observed on regular intervals of time. The plurality of histograms illustrated herein represents sensor behavior of a plurality of sensors. It will be noted that the histogram captures the distribution of different values of the sensor from sensor data for a specified time-period over which machine runs. The time period can be a single run of the machine, a day, a week, and so on. For instance, herein the time period is selected as a 'day' for computing histograms.

As illustrated in FIG. 3, through sensor data, the sensor behavior (histogram) of four sensors (S1, S2, S3 and S4) for five days (D1, D2, D3, D4 and D5) is illustrated. Here, histograms can be uniquely identified by $H_{ij}$. For day D1, the histograms corresponding to the sensors S1, S2, S3 and S4 are illustrated as 312 ($H_{11}$), 314 ($H_{21}$), 316 ($H_{31}$) and 318 ($H_{41}$). For day D2, the histograms corresponding to the sensors S1, S2, S3 and S4 are illustrated as 322, 324, 326 and 328. For day D3, the histograms corresponding to the sensors S1, S2, S3 and S4 are illustrated as 332, 334, 336 and 338. For day D4, the histograms corresponding to the sensors S1, S2, S3 and S4 are illustrated as 342, 344, 346 and 348. For day D5, the histograms corresponding to the sensors S1, S2, S3 and S4 are illustrated as 352, 354, 356 and 358. Herein, the histograms are depicted as continuous lines, since a large number of bins (for example, 1000 bins) are utilized to capture the distribution of sensor-values in the histograms.

In various scenarios, a histogram of a sensor for a day of operation may be similar to that of many other days, of the same as well as other machine instances. All such histograms can be grouped together to form a sensor-cluster using, for instance, a distance measure between the histograms. The days for which sensor behavior of many sensors is similar may be clustered, in a manner that all such clusters collectively cover most of the observed data. Similar histograms are marked by same sensor-cluster-id $C_{ik}$. For example, the histograms of S1 and S2 are similar on Day-1 and Day-2 (histogram 312, 322 are similar, and histograms 314, 324 are similar). On Day-3, the histogram of S1 is slightly different, while that of S2 is similar. Further, on Day-4, it is very different for S1 and S2 from rest of the days, while the histograms of S3 and S4 are similar to that of Day-1. Also, as is seen from FIG. 3, no two days are similar to each other with respect to all the sensor behaviors for that day, and therefore a subset of sensors is to be determined for which some of the days are similar in terms of sensor behavior.

Various embodiments of the present disclosure provide method and system for clustering the histograms of sensors in a manner that a centroid histogram of the sensor-cluster represent the histograms included in that sensor-cluster. Such sensor-clusters are enumerated as frequently occurring patterns of sensor histograms and summarize the voluminous multivariate sensor data. As illustrated in FIG. 3, a set of histograms $\{H_{11}, H_{12}, H_{13}\}$ are similar, while $H_{13}$ is slightly different from the other two. So the system (for example the system 200 of FIG. 2) may be caused to put them all into one or more clusters, depending on a selection of a boundary of the sensor-clusters. In an embodiment, the system may be caused to determine cluster boundaries collaboratively with sensor-clusters of other sensors. For example, the system may be caused to put such sets of histograms into one cluster if corresponding days are in one sensor-cluster for other sensor(s) so as to cluster days of operations. As a result, in the present example $\{H_{11}$ (312), $H_{12}$ (322), $H_{13}$ (332)$\}$ may form one cluster because Day-1, Day-2 and Day-3 are in one sensor-cluster ($C_{21}$) of S2. Similarly, because Day-2, Day-3 and Day-5 are not together in any other sensor-cluster, so $\{H_{32}$ (326), $H_{33}$ (336)$\}$ and $H_{35}$ (346) may be in two different sensor-clusters.

Upon forming the sensor-clusters of histograms, the days that are part of the same sensor-cluster may be grouped for many (but not all) sensors. Clustering the days according to a subset of sensors may be equivalent to subspace clustering. The system is caused to select multiple different subsets of sensors for grouping the days, thereby referring the clustering as multi-subspace clustering. These sensor-clusters can then be described in the form of a set of rules (or frequently occurring patterns). Referring to FIG. 3, two patterns can describe most of the days; $\{(C_{11}+C_{12}); C_{21}\}$ describes Day-1, Day-2 and Day-3, and $\{C_{31}; (C_{41}+C_{44})\}$ describe Day-1 and Day-4. The system 200 is caused to identify such rules or patterns in unsupervised manner.

Figure 4:
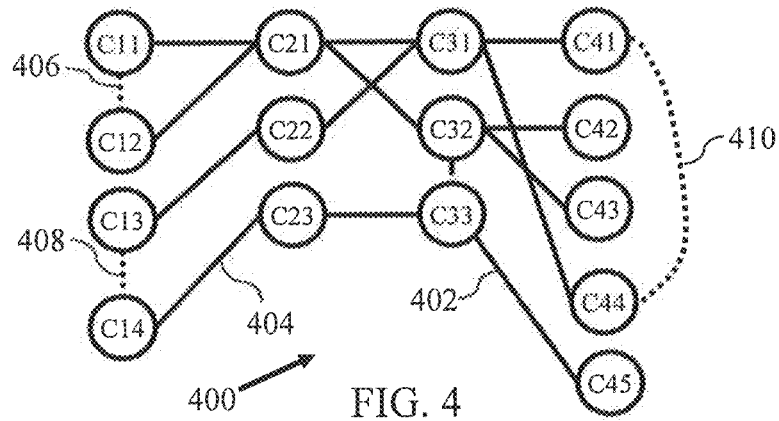
FIG. 4 is a graph created from the histograms of FIG. 3, according to some embodiments of the present disclosure.

FIG. 4 illustrates a graph 400 created from histograms observed in FIG. 3, in accordance with an example embodiment. The graph 400 is an example of the first graph described with reference to FIG. 2. The graph 400 can be utilized to identify co-occurring sensor-clusters (or, the sensor-clusters of different sensors that contain mostly the same set of days). Each day can be represented by a set of cluster-identifiers of the different sensor-clusters in which its sensor histograms lie. Two or more sensor-clusters of the same sensor can be merged when it is determined that the two or more sensor-clusters have most days common with a cluster of another sensor, while the distance (for example, Euclidean distance) between the centroids of the sensor-clusters still remains bounded by a second threshold. For the example described with reference to FIG. 3, the sensor-clusters $C_{11}$ and $C_{12}$ can be merged because $C_{11}$, $C_{12}$ share days with another cluster $C_{21}$, and the distance between the centroids of $C_{11}$, $C_{12}$ is also small.

The clusters are modeled as nodes in the graph 400. For the example of sensor-clusters described with reference to FIG. 3, the graph 400 includes a plurality of sensor-clusters such as sensor-clusters $C_{11}$, $C_{12}$, $C_{13}$, $C_{14}$, $C_{21}$, $C_{22}$, $C_{23}$, $C_{31}$, $C_{32}$, $C_{33}$, $C_{41}$, $C_{42}$, $C_{43}$, $C_{44}$, and $C_{45}$. The graph 400 further includes a plurality of edges between the plurality of nodes (sensor-clusters). The edges are drawn between two nodes of the graph if the two nodes belong to the same sensor and the distance (for example, Euclidean distance) between them is smaller than a second threshold value of distance measure. Herein, the distance measure is encoded as the weight of such an edge. Such edges are referred to as intra-cluster edges, and are represented by dotted lines in the graph 400. For example, the edges are 402, 404 intra-cluster edges. It will be noted that all the edges represented by dotted-lines in the graph 400 are intra-cluster edges, however for the brevity of description and clarity of understanding, we have marked only three intra-cluster edges (406, 408, 410) in FIG. 4.

The graph 400 also includes inter-cluster edges. An inter-cluster edge is the edge between sensor-clusters of the different sensors, and is represented as solid lines in FIG. 4. An inter-cluster edge exists between clusters of two sensors if they both occur in a one rule of the first set of rules (or a single frequent pattern). For example, the edges 402, 404 represent inter-cluster edges in the graph 400. As described with reference to FIG. 2, the merging of sensor-clusters in the sub-graphs results in formation of merged sensor-clusters (second set of sensor-clusters). So, the day-wise encoded data is updated with the merged sensor-clusters to determine frequent patterns.

Figure 5:
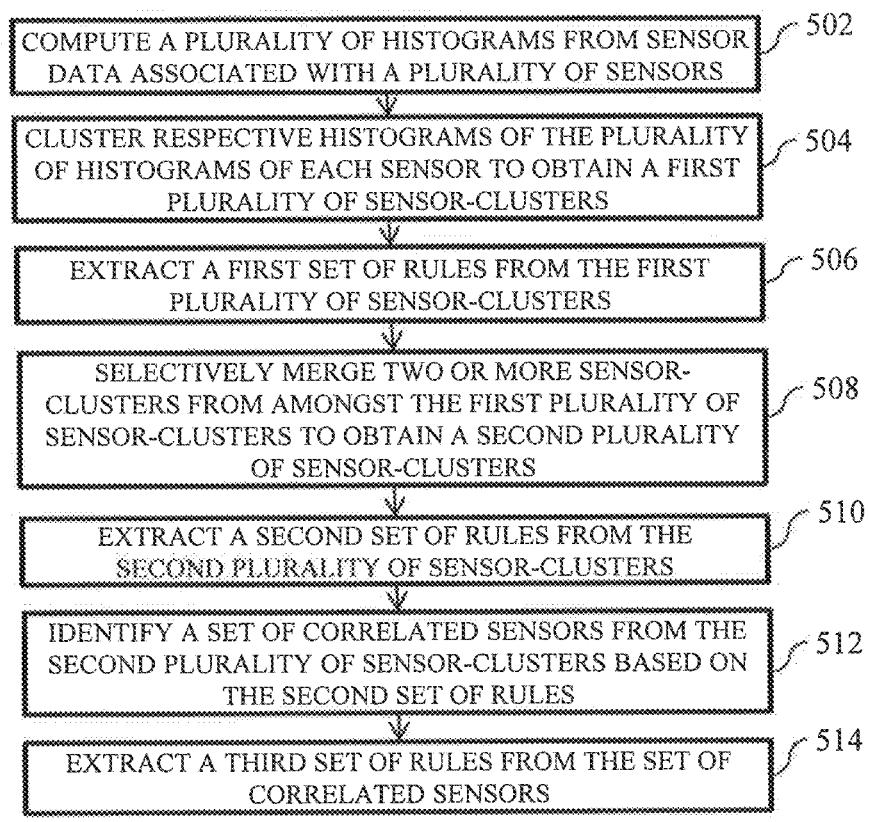
FIG. 5 is a flow diagram of a method for summarizing multi-sensor data, in accordance with some embodiments of the present disclosure.

FIG. 5 illustrates a flow diagram of a method 500 for summarizing multi-sensor data, in accordance with the present disclosure. The method 500 facilitates in succinctly summarizing a large collection of multi-sensor data using multi-subspace clustering. In particular, the system can summarize usage and behavioral patterns of a collection of machines embodying multiple sensors, using the multi-sensor data collected from the machines. The multi-sensor data, or the sensor data may include sensor values/reading of a plurality of sensors collected over a period of time or during run of machines embodying such sensors. For example, the sensor data may be pertaining to a plurality of days.

At 502, the method includes computing a plurality of histograms from sensor data associated with a plurality of sensors. In an embodiment, each histogram is representative of behavior of a sensor of the plurality of sensors for a day. At 504, respective histograms from the plurality of histograms of each of the plurality of sensors are clustered to obtain a first plurality of sensor-clusters. In an embodiment, the respective histograms can be clustered into a sensor-cluster based on the shape similarity of the respective histograms. An example of clustering the plurality of histograms is described with reference to FIG. 4. Each sensor-cluster of the first plurality of sensor-clusters includes a centroid histogram representative of distinct sensor behavior for a sensor of the plurality of sensors. In an embodiment, the respective histograms associated with the sensor-clusters of the first plurality of sensor-clusters are bounded by a first threshold distance measure.

At 506, a first set of rules is extracted from the first plurality of sensor-clusters. In an embodiment, the first set of rules defines patterns of histograms from amongst the plurality of histograms of a set of sensors, where the patterns of histograms occurring frequently over a time period. In an embodiment, the first set of rules is extracted by using a frequent pattern mining technique. In an embodiment, a rule of the first set of rules includes sensor-clusters of different sensors, such that only one sensor-cluster of a sensor can be present in a rule and not more.

At 508, the method includes selectively merging, corresponding to a sensor of the plurality of sensors, two or more sensor-clusters from amongst the first plurality of sensor-clusters to obtain a second plurality of sensor-clusters. The two or more sensor-clusters are merged based on two or more rules from amongst the first set of rules associated with the two or more sensor-clusters and a distance measure between the two or more sensor-clusters of the sensor. In an embodiment, the two or more sensor-clusters of the sensor are selectively merged based on a determination of co-occurrence of one or more other sensors of the plurality of sensors in the two or more sensor-clusters for a same time period. In an embodiment, the determination of the co-occurrence of the one or more sensor-clusters includes representing the first plurality of sensor-clusters and the first set of rules in form of a first graph. The first graph is described in detail with reference to FIG. 4. The first graph comprising a plurality of nodes and a plurality of edges connecting the plurality of nodes. The plurality of nodes includes the first plurality of sensor-clusters, and the plurality of edges includes a set of intra-cluster edge and a set of inter-cluster edge, such that an inter-cluster edge includes an edge between sensor-clusters associated with a rule from amongst the first set of rules, and an intra-cluster edge includes an edge between sensor-clusters of a sensor having the distance measure between the sensor-clusters less than a second threshold distance measure. The second plurality of sensor-clusters are identified from the first graph. In an embodiment, the second set of sensor clusters are formed after merging the sensor-clusters from the first graph. The first graph includes one or more sub-graphs having sensor-clusters associated with the set of sensors. The one or more sub-graphs are determined based on community detection technique. A subgraph in the first graph represents a group of strongly connected sensor-clusters based co-occurrence derived from the first set of rules and similarity determined by the distance between the intra-sensor-clusters. The two or more sensor-clusters associated with the sensor are merged on determination of presence of an intra-edge between the two or more sensor-clusters.

At 510, the method includes extracting a second set of rules from the second plurality of sensor-clusters. The second set of rules is indicative of distinct sensor behaviors associated with the second plurality of sensor-clusters. In an embodiment, the second set of rules are extracted based on the frequent pattern mining technique.

At 512, a set of correlated sensors are identified from the second plurality of sensor-clusters based on the second set of rules. The second set of rules are represented in form of a second graph. The second graph includes a plurality of nodes and a plurality of edges connecting the plurality of nodes, such that the plurality of nodes includes the second plurality of sensor-clusters, and the plurality of edges includes a set of inter-cluster edges. A plurality of unique sensors associated with the second plurality of sensor-clusters are identified from the sub-graphs in the second graph, such that the plurality of unique sensors includes the set of correlated sensors.

At 514, a third set of rules is extracted from the set of correlated sensors. The third set of rules summarizes the multi-sensor data to represent prominent co-occurring sensor behaviors. For extracting the third set of rules a frequent pattern mining technique is applied on each set of correlated sensors to obtain a set of frequent patterns, and the set of frequent patterns are clustered based on mutual overlap between the plurality of frequent patterns to obtain the third set of rules. In an embodiment, clustering the plurality of frequent patterns are clustered based on mutual overlap by utilizing a technique called Alternating Covers of Rules and Exceptions (ACRE). ACRE is a technique for interpreting a dataset having a plurality of itemsets. The technique includes computing a plurality of rule sets pertaining to the dataset. The plurality of rule sets are computed based on an association rule mining technique. The technique may further include clustering, overlapping rules within the dataset. The overlapping rules pertain to common transactions from the dataset. In addition, the ACRE technique may include selecting, at least one rule from each cluster. The at least one rule interprets the itemsets contained within each cluster.

An example of applying the disclosed multi-subspace clustering model is provided below with reference to FIGS. 6A-6C.

Figure 6A:
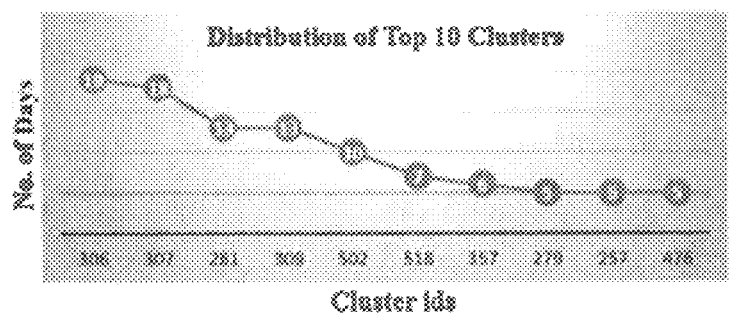
FIGS. 6A-6C illustrates example results obtained on summarizing multi-sensor data, in accordance with example embodiment.
Figure 6B:
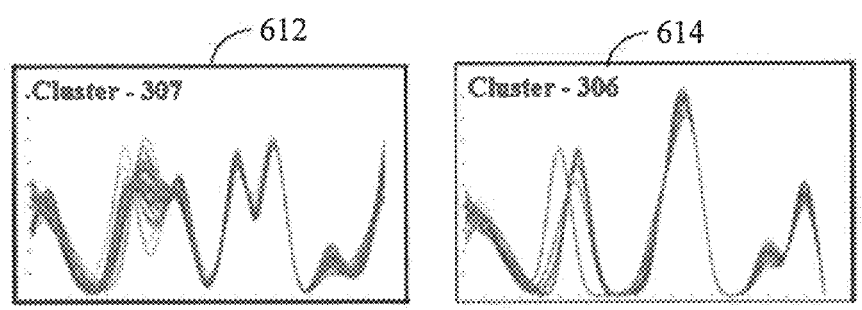
Figure 6C:
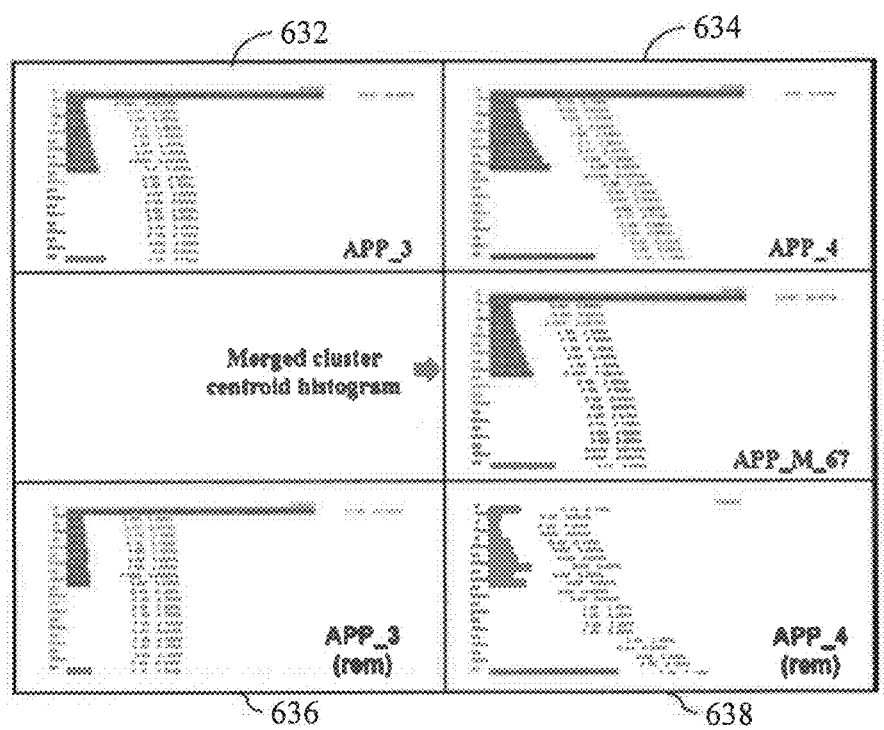

FIGS. 6A-6C illustrates an example results obtained on summarizing multi-sensor data in accordance with example embodiment. Herein the sensor data is obtained from heavy-duty industrial machines. Said sensor data is obtained from the running of different models of engines, each in different kinds of equipment for over three years. At each time instant (for example, at a second) sensor recordings from over 200 sensors such as oil temperature, speed, coolant temperature, and so on, are recorded. The data pertains to time-period of 3 years (850 days) for one type of engine which was installed in three different kinds of equipment (also called an 'application' in domain parlance). Various embodiment of the disclosed multi-subspace clustering model facilitate in determining distinct sensor behaviors and also the co-occurring sensor behaviors covering a significant fraction of the days so as to succinctly summarize the daily behaviors of these engines by discovering a small set of rules that cover a large fraction (50%) of the data, 1000 bin histograms are generated for each of the sensors individually.

The system applied BIRCH model on all of the sensors, resulting in a clustering problem with 10,000 dimensions (1000 bins per sensor, 10 sensors). A cluster distribution of the top 10 clusters obtained by applying BIRCH is illustrated with reference to FIG. 6A. FIG. 5A illustrates a variation of cluster identifiers (plotted on the X-axis) with number of days contained in each sensor-cluster (plotted on the Y-axis) obtained by application of BIRCH model. Application of BIRCH to the sensor data of all the sensors resulted in a clustering problem with 10,000 dimensions (1000 bins per sensor, 10 sensors). Referring to FIG. 6B, histogram patterns (612, 614) of the top 2 clusters from amongst the clusters depicted in FIG. 6A are illustrated. As is seen, the total coverage of the top 10 clusters is 101 out of 850 days, which is only 12% of the total data.

Application of DBSCAN on the sensor data produced similar results. DBSCAN requires two parameters, namely $\epsilon$ and minPts for clustering. A table (Table I) including coverage of days based on different values of $\epsilon$ and minPts=1 is presented below:

TABLE I

DBSCAN CLUSTERING RESULTS

| $\epsilon$ | Coverage (Top 10 clusters) | No. of Clusters |
| --- | --- | --- |
| 3 | 15% | 606 |
| 5 | 52% | 316 |
| 10 | 85% | 39 |

As is seen from the table (table I) above, for a smaller $\epsilon$ ($\epsilon=3$) value, 606 clusters were obtained, out of which the top 10 covered 15% of the days, whereas for a larger value of $\epsilon$ ($\epsilon=10$), 39 clusters are obtained, of which one cluster contains 711 days. Though the coverage of days is more, the clusters obtained by DBSCAN model are more noisy than those determined to be in FIG. 6A. Thus, clustering all the sensors does not facilitate in summarizing the sensor data efficiently, since available methods produces either noisy clusters or too many clusters with small number of days resulting in low data coverage.

A co-variance matrix for 10 sensors is computed and 3 sets of correlated sensors are identified using community detection. For community detection, the co-variance matrix is encoded as a graph (for example, the first graph) where each node is a sensor and an edge between two nodes are represented by the co-variance value of the sensors. 2 of the sets of correlated sensors contained 2 sensors each and the third set of correlated sensors contained 6 sensors. The sensor data that is clustered consist of these 6 sensors only using BIRCH with two radii ($\tau_{nk}=30$ and $\tau_{nk}=25$). For $\tau_{nk}=30$, 400 sensor-clusters are obtained of which the top sensor-cluster contains 60 days. The coverage of the top 10 clusters was 27% (234 days) of the days. For $\tau_{nk}=25$, 478 clusters are obtained, top cluster containing 43 days and the coverage of the top 10 clusters was 22% (188 days). Thus, a succinct clustering that also covered a large fraction of the data could not be obtained by selecting a subspace of clusters based on intra-sensor co-variance.

The proposed systems and method for summarizing sensor-data provides a multi-subspace clustering approach, where, first the sensor histograms are clustered individually, so as to group together all similar sensor behaviors into clusters, such that each cluster centroid represents a distinct sensor behavior. An example of distinct sensor behavior determined for the plurality of sensor-clusters is presented in the table (table II) below:

TABLE II

TABLE II. DISTINCT SENSOR BEHAVIORS

| Sensor Names | No. of Distinct Behaviors |
|---|---|
| APP | 67 |
| BV | 365 |
| CIT | 237 |
| CT | 463 |
| ES | 182 |
| FT | 321 |
| NBT | 326 |
| NET | 325 |
| OPSV | 29 |
| SPTFQ | 151 |

As illustrated in table II above, different numbers of distinct behaviors are found for all the sensors. For clustering the sensor histograms, a small value of radius is selected (which also produces a low DB-Index), even though this resulted in many cases where similar histograms/sensor behaviors were spread across different clusters. Accordingly, the disclosed system is caused to organize the sensor data in form of records such that each day (a row in the sensor data) is represented with the distinct sensor behaviors that the sensors followed on that day, i.e., the cluster-identifiers that each day belonged to. Frequent pattern mining with minimum support, sup=5% is performed on this sensor data to find high-support frequently occurring patterns (a first set of rules) consisting of different sensor-behaviors.

The system is caused to merge sensor-clusters that co-occur with a cluster of another sensor. To find such similar clusters for merging, the system is caused to encode the information of overlap between sensor-clusters identified by frequent pattern mining (or first set of rules) along with intra-cluster distances of sensor-clusters of the same sensor as a graph, followed by community detection. The system identified 8 communities, and performed cluster merging in those communities. The result of cluster merging from the communities obtained is described in Table IV below:

TABLE IV

COMMUNITIES FOR CLUSTER MERGING

| Community | Sensor | Cluster ids | Total Days | Merged Days |
|---|---|---|---|---|
| 1 | ES | 109, 108 | 264 | 232 |
| 2 | APP | 3, 4 | 194 | 161 |
| 3 | SPTFQ | 5, 8, 12 | 123 | 95 |
| 4 | OPSV | 2, 3, 7, 9 | 435 | 357 |
| 5 | FT | 212, 214, 270 | 310 | 279 |
| 6 | CT | 5, 44 | 208 | 169 |
| 7 | SPTFQ | 2, 11, 51 | 107 | 91 |
| 8 | CIT | 118, 161 | 240 | 199 |

As illustrated in the table (table IV) above, the 2nd column lists the name of the sensors for which cluster merging was performed, 3rd column lists the cluster ids which are identified from the communities for merging, 4th column lists the total days contained in the clusters to be merged and the 5th column lists the days which are merged depending on the second threshold, since the selected clusters will be merged, as described below.

Referring now to FIG. 6C, centroid histograms for two sensor-clusters, APP_3 (represented as 632) and APP_4 (represented as 634), for the sensor APP that are selected by the system for merging, are illustrated. APP_3 has 87 days out of which 80 are included in the merged cluster (APP_M_67) while APP_4 has 107 days and 105 were included for merging. The days which are not included in the merged cluster are left in original clusters thereof. In FIG. 6C, the centroid histograms of the left out days are shown by APP 3(rem) (represented as 636) and APP 4(rem) (represented as 638). As is seen here, the days with slightly different histograms are not included in the merged cluster, and only similar looking histograms are merged, thereby leaving the outliers in original clusters thereof.

After merging the clusters, the day-wise encoded data is updated with the merged clusters. Since for 10 sensors, 2466 distinct sensor behaviors are retrieved after cluster-merging, frequent pattern mining can be performed by identifying a set of correlated sensors and then mining frequent patterns for those correlated sensors only, thereby speed up the frequent pattern mining process and to uncover the patterns with even low support. The set of correlated sensors are determined by utilizing community detection, which results in generating communities of strongly correlated sensors. The second set of frequent patterns (or rules) are represented in form of a graph and communities (or sub-graphs) ae detected in that graph using modularity algorithm. For 10 sensors, 6 communities are identified, as shown in Table III below:

TABLE III

COMMUNITIES FOR CORRELATED SENSORS

| Community | Sensor-Cluster | Correlated Sensors |
|---|---|---|
| 1 | FT_270 | FT |
| 2 | NBT_42, NET_109, SPTFQ_M_15, APP_51 | NBT, NET, SPTFQ, APP |
| 3 | ES_23 | ES |
| 4 | CT_M_463, OPSV_M_29, SPTFQ_51, APP_10, CIT_M_237, APP_M_67 | CT, OPSV, SPTFQ, APP, CIT |
| 5 | CIT_164 | CIT |
| 6 | FT_M_323, BV_36, ES_M_184, SPTFQ_M_152 | FT, BV, ES, SPTFQ |

As illustrated in table III above, 3 communities have 3, 3, and 4 sensor-clusters each respectively while rest communities are singleton communities. The system then mines the frequent patterns for the set of correlated sensors, thereby reducing the number of distinct items for a round of pattern mining. Frequent pattern mining on these 3 set of correlated sensors results in 3 sets of frequent patterns, which are combined (by using rule-clustering technique) to identify top minimal overlapping patterns which covered significant fraction of the days. The result of multi subspace clustering on the sensor data is described in the table below:

TABLE V

TOP PATTERNS OBTAINED FROM ENGINE DATA

| Cluster | Top Pattern | Support | Application |
|---|---|---|---|
| 1 | CIT_M_237, OPSV_M_29 Application Specific: APP_10, CIT_M_237, SPTFQ_51 | 106 52 | A1(64), A2(27), A3(15) A1 |
| 2 | OPSV_M_29, APP_51 Application Specific: OPSV_M_29, APP_51 | 95 92 | A1(0), A2(92), A(3) A2 |

TABLE V-continued

TOP PATTERNS OBTAINED FROM ENGINE DATA

| Cluster | Top Pattern | Support | Application |
|---|---|---|---|
| 3 | NBT_42, NET_109 | 277 | A1(0), A2(39), A3(238) |
| | Application Specific: | | |
| | NBT_42, NET_109, | 152 | A3 |
| | APP_M_67, ES_M_184 | | |

As shown in the table above, the three rules or top patterns are defined in terms of merged of merged sensor-clusters. Each pattern of sensor-clusters predominantly belonged to a different application out of the three known types of equipment that the engines were deployed in, i.e., A1, A2 and A3. The top three behaviors from each cluster explains the working of the machine for 50% of the total number of days. {CIT_M_237, OPSV_M_29} had an overlap of 23% with {OPSV_M_29, APP_51} and 19% with {NBT_42, NET_109}, {NBT_42, NET_109} and {OPSV_M_29, APP_51} have an overlap of 12%. For the top patterns, the table (4th column) also lists how many days the pattern are observed for each application. The 3 application-specific patterns are non-overlapping and covered 35% of days.

Various embodiments of the disclosed method and system provides a succinct summary of the usage and behavioural patterns of a collection of similar machines using multi-sensor data observed over a large number of days in the form of a set of rules. Each rule of the set of rules is described by membership in clusters of possibly different sets of sensors. Each sensor-cluster identifies a particular distribution of sensor values across a day. The disclosed method presents a procedure to automatically discover a small set of rules, as well as the single-sensor clusters they comprise of, so that these rules collectively cover most of the observed sensor data.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A processor-implemented method for summarizing multi-sensor data associated with a machine or a device to summarize usage or behavior patterns of the machine or device, the method comprising:

computing, via one or more hardware processors, a plurality of histograms from sensor data associated with a plurality of sensors, wherein the sensor data is multi-sensor data received from machine or device and the sensor data is multi-dimensional data, and wherein the histograms are representative of each of the sensors' behavior for a time period of operation of the machine or the device;

clustering, via the one or more hardware processors and from the plurality of histograms, respective histograms of each of the plurality of sensors to obtain a first plurality of sensor-clusters based on shape of the respective histograms, each sensor-cluster of the first plurality of sensor-clusters comprising a centroid histogram representative of distinct sensor behavior for a distinct sensor of the plurality of sensors;

performing, via the one or more hardware processors, frequent pattern mining on the first plurality of sensor-clusters to extract a first set of rules, wherein a rule of the first set of rules being associated with a set of sensors of the plurality of sensors and comprising a set of sensor-clusters occurring frequently in the first plurality of sensor-clusters over the time period;

merging, via the one or more hardware processors, selectively two or more sensor-clusters from amongst the first plurality of sensor-clusters to obtain a second plurality of sensor-clusters, the two or more sensor-clusters selected corresponding to a sensor of the set of sensors, the two or more sensor-clusters being merged based on two or more rules from amongst the first set of rules associated with the two or more sensor-clusters and a distance measure between the two or more sensor-clusters of the sensor, wherein the two or more sensor-clusters of the sensors are merged based on co-occurrence of one or more other sensors of the plurality of sensors in the two or more sensor-clusters for a same time period;

extracting, via the one or more hardware processors, a second set of rules from the second plurality of sensor-clusters, the second set of rules indicative of distinct sensor behaviors associated with the second plurality of sensor-clusters;

identifying, via the one or more hardware processors, a plurality of sets of correlated sensors from the second plurality of sensor-clusters based on the second set of rules; and extracting, via the one or more hardware processors, a third set of rules from the one or more sets of correlated sensors, the third set of rules summarizing the multi-sensor data to represent prominent co-occurring sensor behaviors, wherein step by step extraction of the first, second and third set of rules enables summarization of the multi-sensor data to summarize the usage or behavior patterns of the machine or the device.

2. The method of claim 1, wherein the respective histograms associated with a sensor-cluster of the first plurality of sensor-clusters are bounded by a first threshold distance measure.

3. The method of claim 2, wherein the first threshold distance measure includes one of an Euclidean distance, earth-mover distance, Kullback-Leibler divergence, Bhattacharyya distance, Manhattan distance, and Wasserstein metric.

4. The method of claim 1, wherein the clustering is performed based on a Balanced Iterative Reducing and Clustering using Hierarchies (BIRCH) clustering model.

5. The method of claim 1, wherein the second set of rules are extracted by using a frequent pattern mining technique.

6. The method of claim 1, wherein the determination of the co-occurrence of the one or more other sensors, by using a graph based technique, comprises: representing the first plurality of sensor-clusters and the first set of rules in form of a first graph, the first graph comprising a plurality of nodes and a plurality of edges connecting the plurality of nodes, wherein the plurality of nodes represents the first plurality of sensor-clusters, and the plurality of edges comprises a set of intra-cluster edge and a set of inter-cluster edge, wherein an inter-cluster edge comprises an edge between sensor-clusters associated with a rule of the first set of rules, and an intra-cluster edge comprises an edge between sensor-clusters of a sensor having the distance measure between the sensor-clusters less than a second threshold distance measure; and identifying the second plurality of sensor-clusters from the first graph, wherein a sensor-cluster of the second plurality of the sensor-clusters is identified from a sub-graph of the first graph, wherein the sub-graph comprises the two or more sensor-clusters associated with the set of sensors, and wherein the two or more sensor-clusters associated with a sensor of the set of sensors in the sub-graph are merged on determination of presence of the intra-cluster edge between the two or more sensor-clusters.

7. The method of claim 1, wherein identifying the plurality of sets of correlated sensors associated with the second plurality of sensor-clusters comprises: representing the second set of rules and the second plurality of sensor-clusters in form of a second graph, the second graph comprising a plurality of nodes and a plurality of edges connecting the plurality of nodes, wherein the plurality of nodes represents the second plurality of sensor-clusters, and the plurality of edges comprises inter-cluster edges between the second plurality of sensor-clusters; and identifying the plurality of sets of correlated sensors associated with the second plurality of sensor-clusters from one or more sub-graphs of the second graph, wherein a plurality of unique sensors associated with each of the one or more sub-graphs represents the set of correlated sensors.

8. The method of claim 1, wherein extracting the third set of rules comprises: applying frequent pattern mining to each of the plurality of sets of correlated sensors to obtain a set of frequent patterns; and clustering the set of frequent patterns based on mutual overlap between the plurality of frequent patterns to obtain the third set of rules.

9. A computer implemented system for summarizing multi-sensor data associated with a machine or a device to summarize usage or behavior patterns of the machine or the device, the system comprising:

a memory storing instructions; and
one or more hardware processors coupled to said memory, wherein said one or more hardware processors configured by said instructions to:
compute a plurality of histograms from sensor data associated with a plurality of sensors, wherein the sensor data is multi-sensor data received from a machine or a device and the sensor data is multi-dimensional data, and wherein the histograms are representative of each of the sensors' behavior for a time period of operation of the machine or the device;
cluster, from the plurality of histograms, respective histograms of each of the plurality of sensors to obtain a first plurality of sensor-clusters based on shape of the respective histograms, each sensor-cluster of the first plurality of sensor-clusters comprising a centroid histogram representative of distinct sensor behavior for a distinct sensor of the plurality of sensors,
perform frequent pattern mining on the first plurality of sensor-clusters to extract a first set of rules, wherein a rule of the first set of rules being associated with a set of sensors of the plurality of sensors and comprising a set of sensor-clusters occurring frequently in the first plurality of sensor-clusters over the time period,
merge selectively two or more sensor-clusters from amongst the first plurality of sensor-clusters to obtain a second plurality of sensor-clusters, the two or more sensor-clusters selected corresponding to a sensor of the set of sensors, the two or more sensor-clusters being merged based on two or more rules from amongst the first set of rules associated with the two or more sensor-clusters and a distance measure between the two or more sensor-clusters of the sensor, wherein the two or more sensor-clusters of the sensors are merged based on co-occurrence of one or more other sensors of the plurality of sensors in the two or more sensor-clusters for a same time period,
extract a second set of rules from the second plurality of sensor-clusters, the second set of rules indicative of distinct sensor behaviors associated with the second plurality of sensor-clusters,
identify a plurality of sets of correlated sensors from the second plurality of sensor-clusters based on the second set of rules, and
extract a third set of rules from the one or more sets of correlated sensors, the third set of rules summarizing the multi-sensor data to represent prominent co-occurring sensor behaviors, wherein step by step extraction of the first, second and third set of rules enables summarization of the multi-sensor data to summarize the usage or behavior patterns of the machine or the device.

10. The system of claim 9, wherein the respective histograms associated with a sensor-cluster of the first plurality of sensor-clusters are bounded by a first threshold distance measure.

11. The system of claim 10, wherein the first threshold distance measure includes one of an Euclidean distance, earth-mover distance, Kullback-Leibler divergence, Bhattacharyya distance, Manhattan distance, and Wasserstein metric.

12. The system of claim 9, wherein the one or more hardware processors are further configured by the instructions to perform clustering based on a Balanced Iterative Reducing and Clustering using Hierarchies (BIRCH) clustering model.

13. The system of claim 9, wherein one or more hardware processors are further configured by the instructions to extract the second set of rules by using a frequent pattern mining technique.

14. The system of claim 9, wherein to determine the co-occurrence of the one or more other sensors, by using a graph based technique, the one or more hardware processors are further configured by the instructions to: represent the first plurality of sensor-clusters and the first set of rules in form of a first graph, the first graph comprising a plurality of nodes and a plurality of edges connecting the plurality of nodes, wherein the plurality of nodes represents the first plurality of sensor-clusters, and the plurality of edges comprises a set of intra-cluster edge and a set of inter-cluster edge, wherein an inter-cluster edge comprises an edge between sensor-clusters associated with a rule of the first set of rules, and an intra-cluster edge comprises an edge between sensor-clusters of a sensor having the distance measure between the sensor-clusters less than a second threshold distance measure; and identify the second plurality of sensor-clusters from the first graph, wherein a sensor-cluster of the second plurality of the sensor-clusters is identified from a sub-graph of the first graph, wherein the sub-graph comprises the two or more sensor-clusters associated with the set of sensors, and wherein the two or more sensor-clusters associated with a sensor of the set of sensors in the sub-graph are merged on determination of presence of the intra-cluster edge between the two or more sensor-clusters.

15. The system of claim 9, wherein to identify the plurality of sets of correlated sensors associated with the second plurality of sensor-clusters, the one or more hardware processors are further configured by the instructions to: represent the second set of rules and the second plurality of sensor-clusters in form of a second graph, the second graph comprising a plurality of nodes and a plurality of edges connecting the plurality of nodes, wherein the plurality of nodes represents the second plurality of sensor-clusters, and the plurality of edges comprises inter-cluster edges between the second plurality of sensor-clusters; and identify the plurality of sets of correlated sensors associated with the second plurality of sensor-clusters from one or more sub-graphs of the second graph, wherein a plurality of unique sensors associated with each of the one or more sub-graphs represents the set of correlated sensors.

16. The system of claim 9, wherein to extract the third set of rules, the one or more hardware processors are further configured by the instructions to: apply frequent pattern mining to each of the plurality of sets of correlated sensors to obtain a set of frequent patterns; and cluster the set of frequent patterns based on mutual overlap between the plurality of frequent patterns to obtain the third set of rules.

17. A non-transitory computer-readable medium having embodied thereon a computer program for executing a method for summarizing multi-sensor data associated with a machine or a device to summarize usage or behavior patterns of the machine or the device, the method comprising:

computing a plurality of histograms from sensor data associated with a plurality of sensors, wherein the sensor data is multi-sensor data received from a machine or a device and the sensor data is multi-dimensional data, and wherein the histograms are representative of each of the sensors' behavior for a time period of operation of the machine or the device;

clustering from the plurality of histograms, respective histograms of each of the plurality of sensors to obtain a first plurality of sensor-clusters based on shape of the respective histograms, each sensor-cluster of the first plurality of sensor-clusters comprising a centroid histogram representative of distinct sensor behavior for a distinct sensor of the plurality of sensors;

performing frequent pattern mining on the first plurality of sensor-clusters to extract a first set of rules, wherein a rule of the first set of rules being associated with a set of sensors of the plurality of sensors and comprising a set of sensor-clusters occurring frequently in the first plurality of sensor-clusters over the time period;

merging selectively two or more sensor-clusters from amongst the first plurality of sensor-clusters to obtain a second plurality of sensor-clusters, the two or more sensor-clusters selected corresponding to a sensor of the set of sensors, the two or more sensor-clusters being merged based on two or more rules from amongst the first set of rules associated with the two or more sensor-clusters and a distance measure between the two or more sensor-clusters of the sensor, wherein the two or more sensor-clusters of the sensors are merged based on co-occurrence of one or more other sensors of the plurality of sensors in the two or more sensor-clusters for a same time period;

extracting a second set of rules from the second plurality of sensor-clusters, the second set of rules indicative of distinct sensor behaviors associated with the second plurality of sensor-clusters;

identifying a plurality of sets of correlated sensors from the second plurality of sensor-clusters based on the second set of rules; and extracting a third set of rules from the one or more sets of correlated sensors, the third set of rules summarizing the multi-sensor data to represent prominent co-occurring sensor behaviors, wherein step by step extraction of the first, second and third set of rules enables summarization of the multi-sensor data to summarize the usage or behavior patterns of the machine or the device.

* * * * *